US011117155B2

(12) United States Patent
Ryon et al.

(10) Patent No.: US 11,117,155 B2
(45) Date of Patent: Sep. 14, 2021

(54) FLUID NOZZLES WITH HEAT SHIELDING

(71) Applicant: Delavan Inc., West Des Moines, IA (US)

(72) Inventors: Jason Ryon, Carlisle, IA (US); Lev A. Prociw, Johnston, IA (US)

(73) Assignee: Delavan Inc., West Des Moines, IA (US)

(*) Notice: Subject to any disclaimer, the term of this patent is extended or adjusted under 35 U.S.C. 154(b) by 55 days.

(21) Appl. No.: 16/593,732

(22) Filed: Oct. 4, 2019

(65) Prior Publication Data
US 2021/0101169 A1 Apr. 8, 2021

(51) Int. Cl.
*B33Y 10/00* (2015.01)
*B05B 15/14* (2018.01)
*F23R 3/28* (2006.01)

(52) U.S. Cl.
CPC .............. *B05B 15/14* (2018.02); *B33Y 10/00* (2014.12); *F23R 3/283* (2013.01)

(58) Field of Classification Search
CPC . B05B 15/14; F05D 2230/60; F05D 2220/32; F02C 7/222; F02C 7/24
See application file for complete search history.

(56) References Cited

U.S. PATENT DOCUMENTS

| 8,806,871 B2 * | 8/2014 | McMasters | F23R 3/28 60/742 |
| 9,400,104 B2 * | 7/2016 | Low | F23R 3/28 |
| 9,556,795 B2 * | 1/2017 | Ryon | F23D 11/38 |
| 9,759,356 B2 | 9/2017 | Ott et al. | |
| 9,791,153 B2 * | 10/2017 | Dai | F23R 3/60 |
| 9,915,480 B2 | 3/2018 | Ott et al. | |
| 9,975,169 B2 | 5/2018 | Xu | |
| 10,378,446 B2 * | 8/2019 | Caples | B23P 15/00 |
| 10,488,047 B2 * | 11/2019 | Ott | F02C 7/222 |

(Continued)

FOREIGN PATENT DOCUMENTS

| CN | 109339951 A | 2/2019 |
| DE | 102017200643 A1 | 7/2018 |
| FR | 1186524 A | 8/1959 |

OTHER PUBLICATIONS

Database WPI, Week 201929, Thomson Scientific, London, GB; An 2019-17673X.

(Continued)

*Primary Examiner* — Lawrence Averick
(74) *Attorney, Agent, or Firm* — Locke Lord LLP; Joshua L. Jones; Scott D. Wofsy

(57) ABSTRACT

A method includes forming a fluid conduit inside a heat shield in an additive manufacturing process, wherein a fluid nozzle is defined at a downstream end of the fluid conduit, and wherein the heat shield is formed about the fluid nozzle. The method includes removing powder from an interior passage of the fluid conduit and fluid nozzle and from an insulation gap defined between the heat shield and the fluid conduit and fluid nozzle. The method includes separating the heat shield, fluid conduit, and fluid nozzle from the build platform. The method includes shifting the fluid conduit and fluid nozzle to a shifted position relative to the heat shield, and securing the fluid conduit and fluid nozzle to the heat shield in the shifted position.

15 Claims, 5 Drawing Sheets

(56) References Cited

U.S. PATENT DOCUMENTS

| | | | |
|---|---|---|---|
| 2009/0255120 A1* | 10/2009 | McMasters | F23D 11/383 |
| | | | 29/889.2 |
| 2009/0255262 A1* | 10/2009 | McMasters | F23R 3/28 |
| | | | 60/742 |
| 2014/0090394 A1* | 4/2014 | Low | F23D 11/107 |
| | | | 60/776 |
| 2014/0291418 A1* | 10/2014 | Ruffing | F02C 7/232 |
| | | | 239/403 |
| 2014/0318137 A1* | 10/2014 | McMasters | F23R 3/28 |
| | | | 60/742 |
| 2015/0069148 A1* | 3/2015 | Ryon | F23D 11/38 |
| | | | 239/397.5 |
| 2016/0003157 A1 | 1/2016 | Ott et al. | |
| 2016/0236271 A1 | 8/2016 | Xu | |
| 2016/0252252 A1* | 9/2016 | Dai | F23D 17/002 |
| | | | 60/740 |
| 2016/0305712 A1* | 10/2016 | Harris | F28F 1/003 |
| 2016/0348913 A1* | 12/2016 | Ott | F23R 3/28 |
| 2017/0138266 A1* | 5/2017 | Caples | B23P 15/00 |
| 2017/0321824 A1 | 11/2017 | Ott et al. | |
| 2018/0163635 A1* | 6/2018 | Marocchini | F02C 9/263 |
| 2019/0120141 A1 | 4/2019 | Ryon et al. | |

OTHER PUBLICATIONS

Extended European Search Report dated Nov. 6, 2020, issued during the prosecution of European Patent Application No. Ep 19214578.7.
Partial European Search Report dated Jul. 24, 2020, issued during the prosecution of European Patent Application No. EP 19214578.7.

* cited by examiner

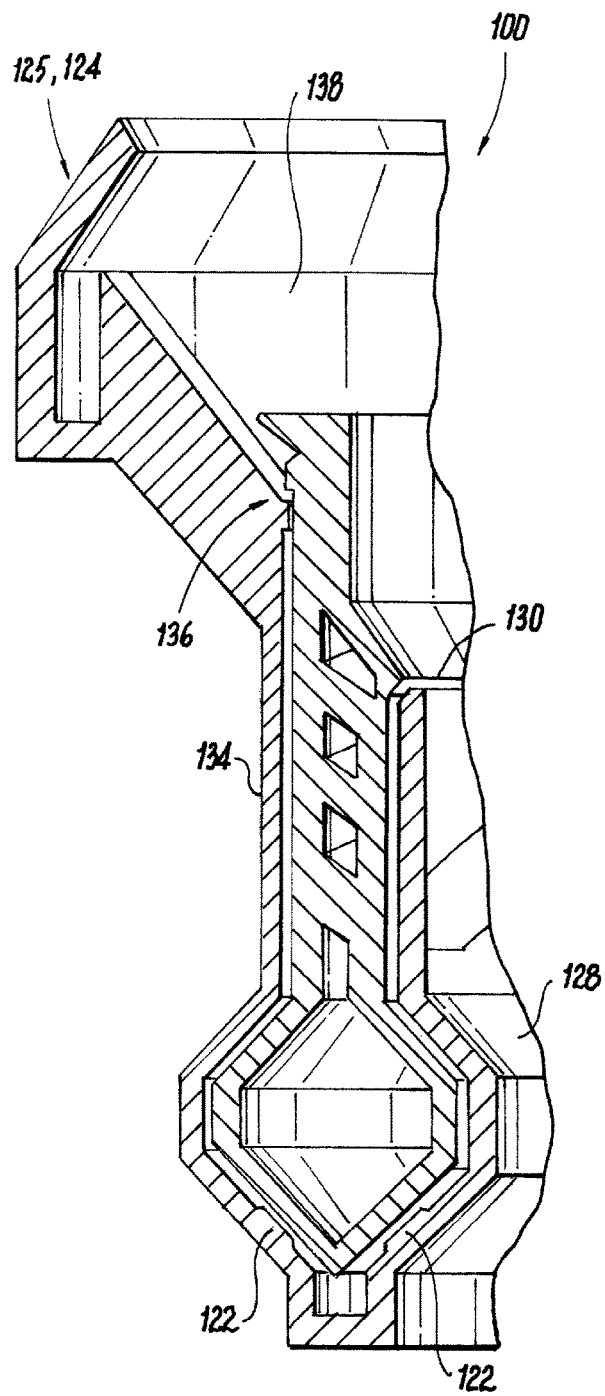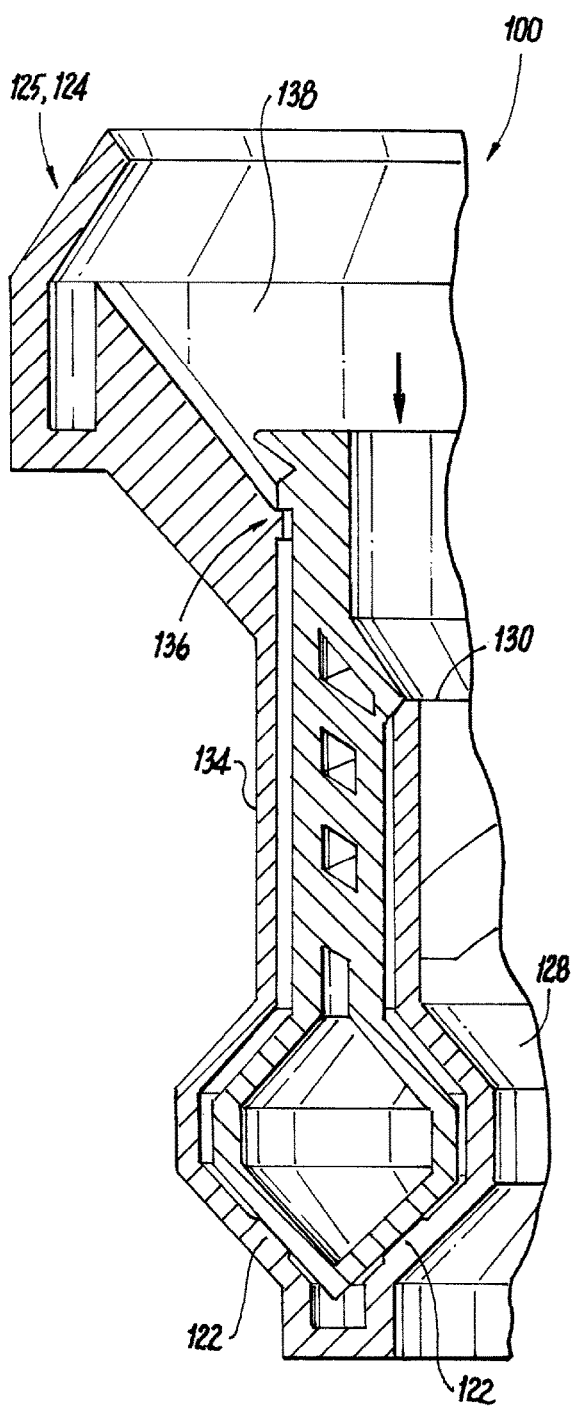
Fig. 6    Fig. 7

FLUID NOZZLES WITH HEAT SHIELDING

BACKGROUND

1. Field

The present disclosure relates to fluid nozzles, and more particularly to fluid nozzles such as used in injectors for gas turbine engines.

2. Description of Related Art

Fluid nozzles such as used for fuel need to be insulated from heat, e.g. in gas turbine engines. It is desirable to make fluid passages using additive manufacturing. However, the internal fluid passage must be supported during an additive process, and the supports thermally connect the conduit to the heat shield. This thermal connection undermines the heat shielding.

The conventional techniques have been considered satisfactory for their intended purpose. However, there is an ever present need for improved systems and methods for fluid conduits. This disclosure provides a solution for this need.

SUMMARY

A method includes forming a fluid conduit inside a heat shield in an additive manufacturing process, wherein a fluid nozzle is defined at a downstream end of the fluid conduit, and wherein the heat shield is formed about the fluid nozzle. The method includes removing powder from an interior passage of the fluid conduit and fluid nozzle and from an insulation gap defined between the heat shield and the fluid conduit and fluid nozzle. The method includes separating the heat shield, fluid conduit, and fluid nozzle from the build platform. The method includes shifting the fluid conduit and fluid nozzle to a shifted position relative to the heat shield, and securing the fluid conduit and fluid nozzle to the heat shield in the shifted position.

Forming the fluid nozzle can include forming the fluid nozzle as an annular terminus at the downstream end of the fluid conduit, wherein the annular terminus defines an annular fluid gallery in fluid communication with a flow channel through the fluid conduit. The heat shield can include an inner heat shield portion radially inside the annular terminus, wherein the inner heat shield portion and the annular terminus define an inner shield gap therebetween, wherein shifting the fluid conduit and fluid nozzle includes reducing axial extent of the inner heat shield gap. The inner heat shield portion can define an inner air swirler radially inward of the fluid nozzle. The heat shield can include an outer heat shield portion radially outside the annular terminus, wherein the outer heat shield portion and the annular terminus define an outer shield gap therebetween, wherein shifting the fluid conduit and fluid nozzle includes reducing axial extent of the outer heat shield gap. The outer heat shield portion can define an outer air passage radially outward of the fluid nozzle. During forming the fluid conduit inside the heat shield, at least a portion of each of the fluid conduit and heat shield can be aligned along a direction that exceeds the maximum build angle of the additive manufacturing process.

Forming the fluid conduit, fluid nozzle, and heat shield can include forming a series of supports between the build platform and the fluid conduit as well as between the build platform and the fluid nozzle. Forming the series of supports can include forming a series of apertures through the heat shield, wherein each support in the series of supports extends through a respective one of the apertures in the series of apertures. The supports can extend through the apertures to support the fluid conduit and the fluid nozzle on the build platform during the build. Shifting the fluid conduit and the fluid nozzle to the shifted position can include shifting the supports through the respective apertures until the supports extend externally from the heat shield. Shifting the supports can include shifting the supports until spacer features engage, spacing the heat shield from the fluid conduit. Securing the fluid conduit and the fluid nozzle to the heat shield can include welding, bolting and/or brazing the supports to the heat shield. Securing the fluid conduit can include welding, bolting, and/or brazing a flange defined at an upstream end of the fluid conduit to a flange defined at an upstream end of the heat shield, wherein the upstream end of the fluid conduit is opposite the downstream end of the fluid conduit.

A system includes a fluid conduit and a fluid nozzle each within a heat shield. The fluid conduit and the fluid nozzle each include a series of supports extending therefrom. The heat shield includes a series of apertures therethrough. Each support in the series of supports extends through a respective one of the apertures in the series of apertures.

At least some of the apertures through the heat shield can be elongated to accommodate relative thermal expansion/contraction between the fluid conduit and the heat shield. The fluid nozzle can form an annular terminus at a downstream end of the fluid conduit, wherein the annular terminus defines an annular fluid gallery in fluid communication with a flow channel through the fluid conduit. The heat shield can include an inner heat shield portion radially inside the annular terminus, wherein the inner heat shield portion and the annular terminus define an inner shield gap therebetween. The inner heat shield portion can define an inner air swirler radially inward of the fluid nozzle. The heat shield can include an outer heat shield portion radially outside the annular terminus, wherein the outer heat shield portion and the annular terminus define an outer shield gap therebetween. The outer heat shield portion can define an outer air passage radially outward of the fluid nozzle.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 6 and 7 are cross-sectional side elevation views of the system of FIG. 1, showing the system before and after shifting the fluid conduit and fluid nozzle into the shifted position, respectively;

DETAILED DESCRIPTION OF THE PREFERRED EMBODIMENTS

Figure 1:
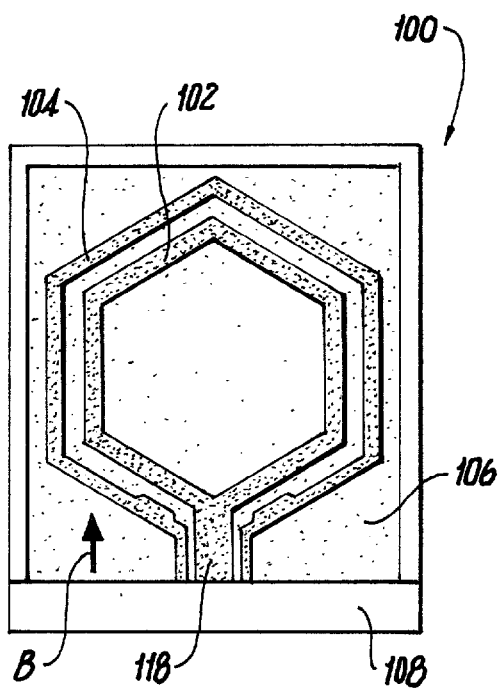
FIG. 1 is a schematic axial elevation view of an embodiment of a system constructed in accordance with the present disclosure, showing the heat shield and fluid conduit during additive manufacturing.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-10, as will be described. The systems and methods described herein can be used to additively manufacture fluid conduits and nozzles with heat shielding, e.g. for fuel injection in gas turbine engines and the like.

Figure 2:
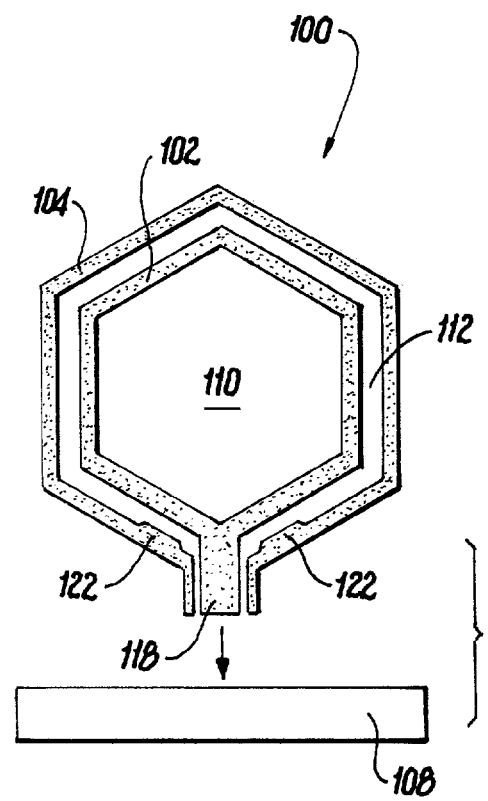
FIG. 2 is a schematic axial elevation view of the system of FIG. 1, showing the system after removal of unfused powder.
Figure 3:
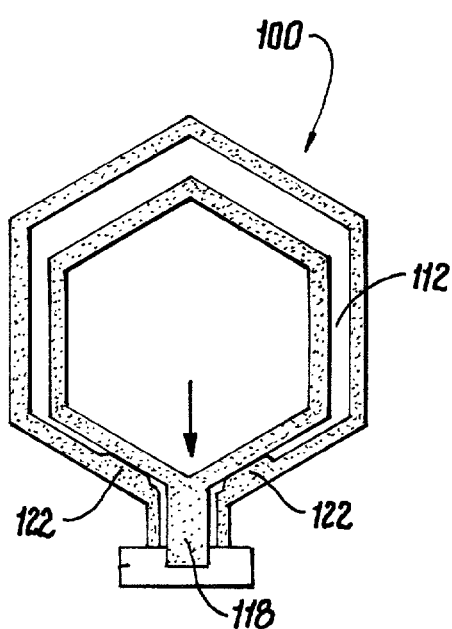
FIG. 3 is a schematic axial elevation view of the system of FIG. 1, showing the system after shifting the heat shield and fluid conduit relative to one another.
Figure 4:
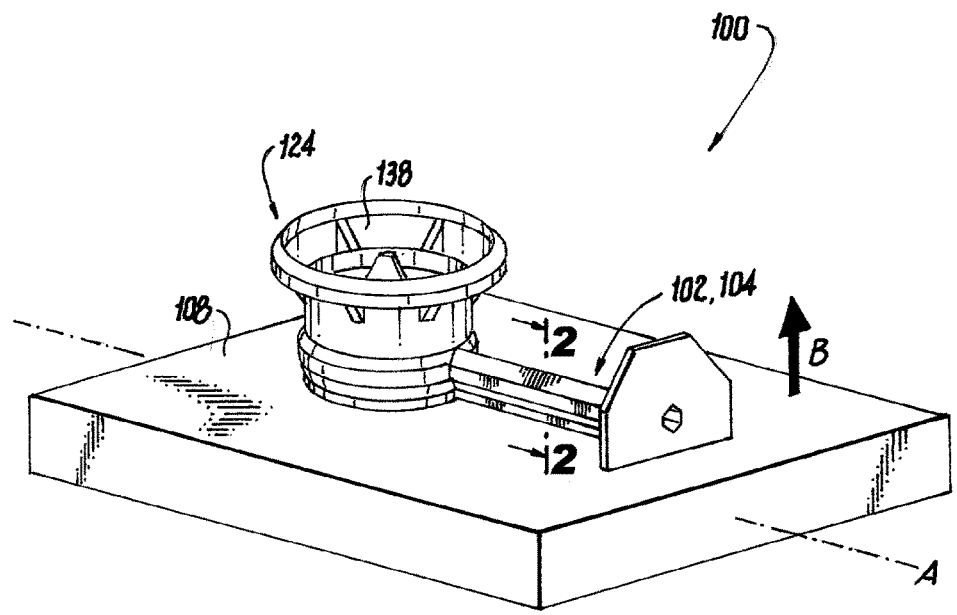
FIG. 4 is a perspective view of the system of FIG. 1, showing the fluid nozzle.

A method includes forming a fluid conduit 102 inside a heat shield 104 in an additive manufacturing process, wherein a fluid nozzle 124 (shown in FIG. 4) is defined at a downstream end of the fluid conduit 102. The heat shield 104 is formed about the fluid nozzle 124 (shown in FIG. 4). The method includes removing powder 106, e.g. unfused additive manufacturing stock powder, from an interior passage 110 of the fluid conduit 102 and fluid nozzle 124. The method also includes removing the powder 106 from an insulation gap 112 defined between the heat shield 104 and the fluid conduit 102 and fluid nozzle 124. The method includes separating the heat shield 104, the fluid conduit 102, and the fluid nozzle 124 from the build platform 108. FIG. 2 shows the system 100 after powder removal and separation from the build platform 108. The method includes shifting the fluid conduit 102 and fluid nozzle 124 to a shifted position (shown in FIG. 3) relative to the heat shield 104, and securing the fluid conduit 102 and fluid nozzle 124 to the heat shield 104 in the shifted position e.g. by welding, bolting, or brazing to a member 104 or the like. With reference to FIG. 4, during forming the fluid conduit 102 and fluid nozzle 124 inside the heat shield 104, at least a portion of each of the fluid conduit 102 and heat shield 104 can be aligned along a direction A that exceeds the maximum build angle of the additive manufacturing process, which can even be, for example perpendicular to the build direction B.

Figure 5:
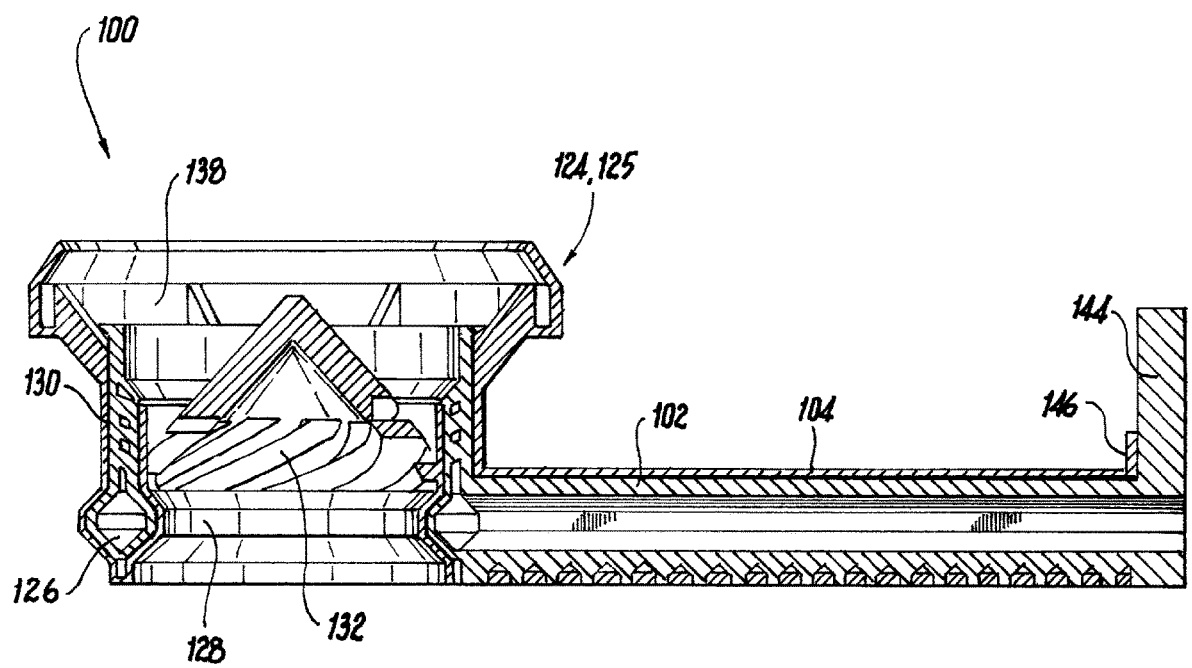
FIG. 5 is a cross-sectional side elevation view of the system of FIG. 1, showing the annular gallery of the fluid nozzle.

With reference now to FIG. 5, forming the fluid nozzle 124 can include forming the fluid nozzle 124 as an annular terminus 125 at the downstream end of the fluid conduit 102, wherein the annular terminus 125 defines an annular fluid gallery 126 in fluid communication with a flow channel (interior passage 110) through the fluid conduit 102. The heat shield 104 can include an inner heat shield portion 128 radially inside the annular terminus 125.

With reference now to FIGS. 6-7, the inner heat shield portion 128 and the annular terminus 125 define an inner shield sealing gap 130 therebetween. Shifting the fluid conduit 102 and fluid nozzle 124 (as shown in FIGS. 2-3) includes reducing axial extent of the inner heat shield sealing gap 104, as shown in FIG. 6, which shows the system 100 before shifting, and in FIG. 7, which shows the system 100 in the shifted position. The inner heat shield portion 128 can define an inner air swirler 132 radially inward of the fluid nozzle 124. The heat shield 104 can include an outer heat shield portion 134 radially outside the annular terminus 125. The outer heat shield portion 134 and the annular terminus 125 define an outer shield sealing gap 136 therebetween. Shifting the fluid conduit 102 and fluid nozzle 124 includes reducing axial extent of the outer heat shield gap 136 similar to how it is described above with respect to the sealing gap 130. The outer heat shield portion 134 can define an outer air passage 138 radially outward of the fluid nozzle 124.

Figure 8:
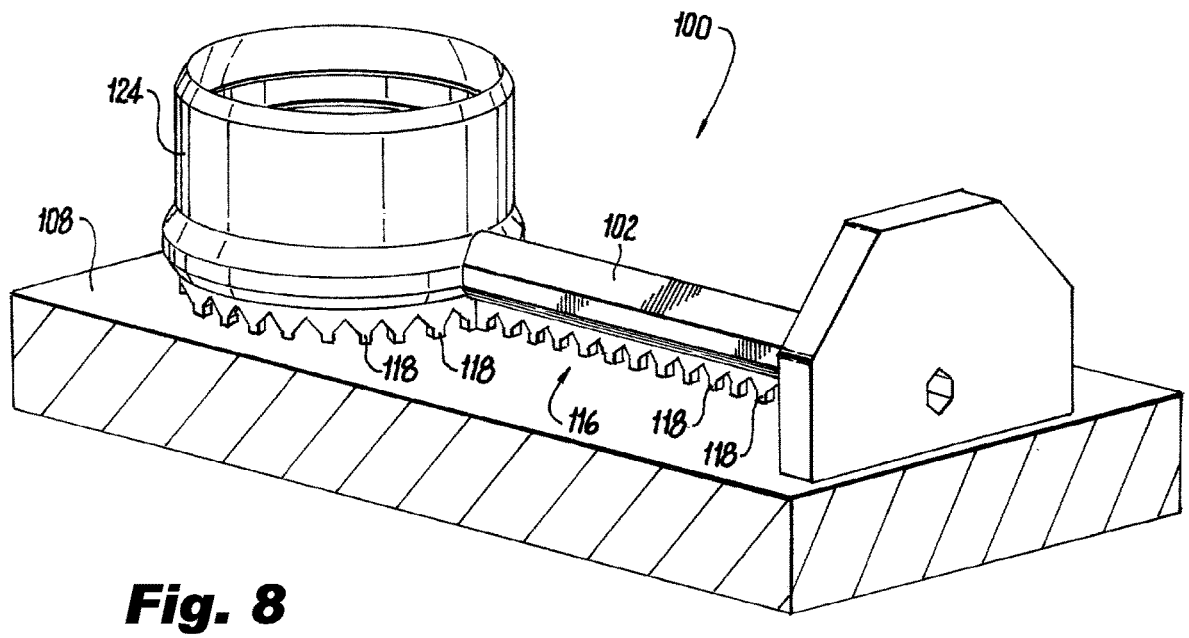
FIG. 8 is a perspective view of a portion of the system of FIG. 1, with the heat shield removed to show the supports 118 supporting the fluid conduit and fluid nozzle on the build platform or plate.
Figure 9:
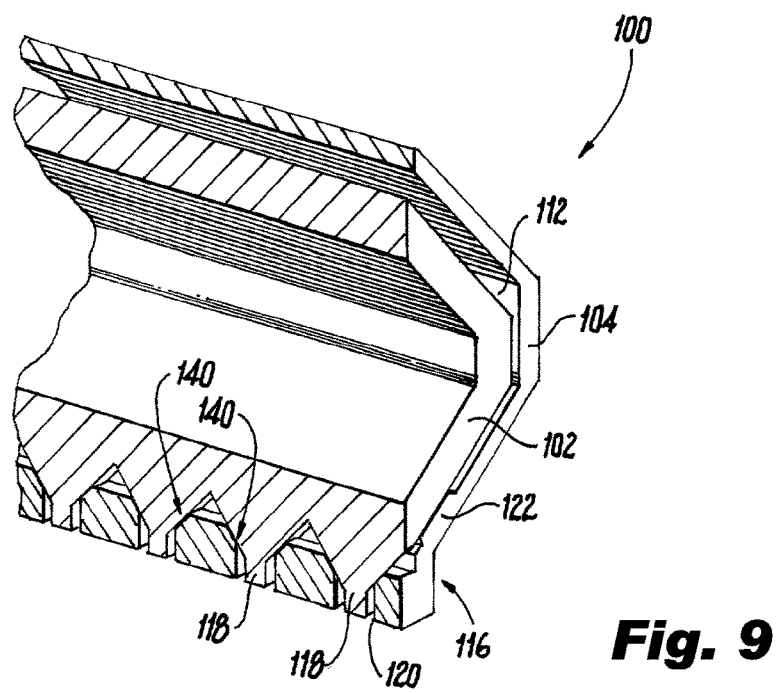
FIG. 9 is a cross-sectional perspective view of portion of the system of FIG. 1, showing the supports extending through apertures in the heat shield.
Figure 10:
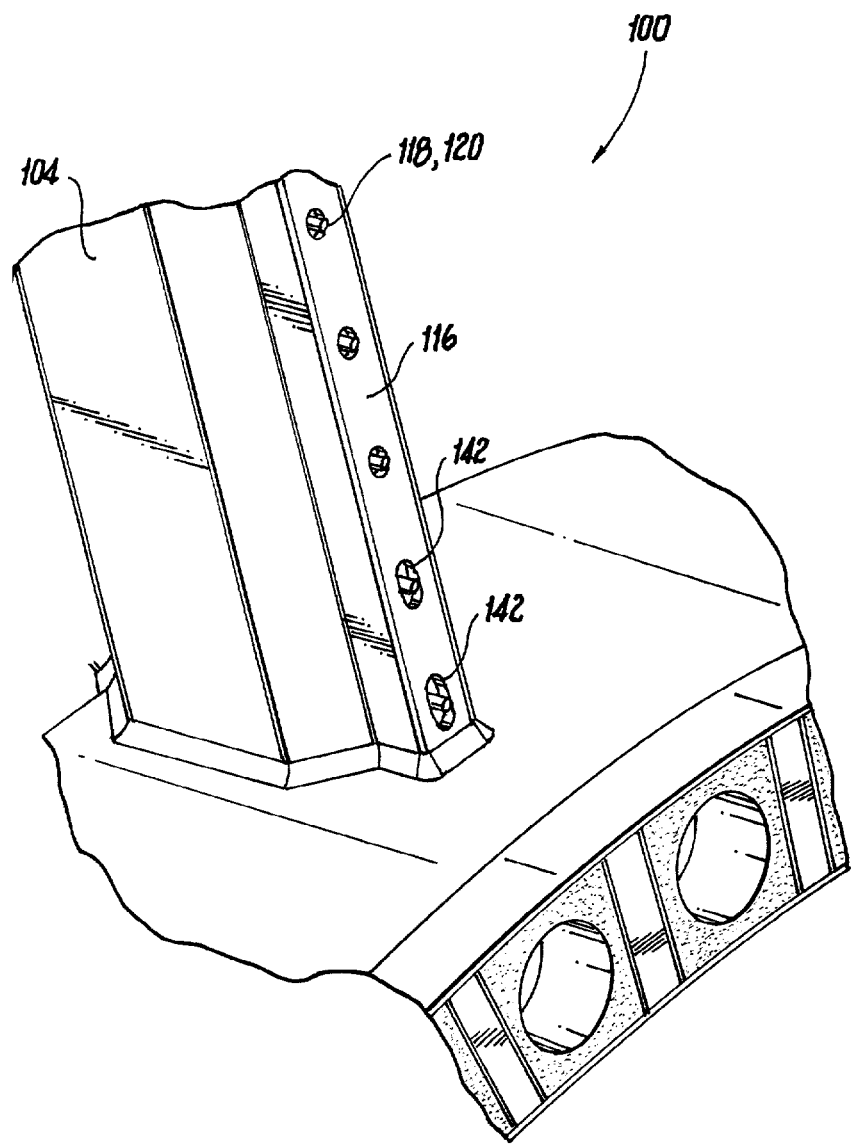
FIG. 10 is a perspective view of a portion of the system of FIG. 1, showing elongated apertures through the heat shield to accommodate relative thermal expansion of the heat shield and fluid conduit.

With reference now to FIG. 8 (which shows the system 100 with the heat shield 104 removed), forming the fluid conduit 102, fluid nozzle 124, and heat shield 104 can include forming a series of supports 118 along a spine 116 of the heat shield 104 and the fluid conduit 102 between the build platform 108 and the fluid conduit 102, as well as between the build platform 108 and the fluid nozzle 124. Forming the series of supports 118 can include forming a series of apertures 120 through the heat shield 104, as shown in FIG. 9. Each support 118, whether extending from the nozzle 124 or from the fluid conduit 102, extends through a respective one of the apertures 120. The supports 118 can extend through the apertures 120 during the build process to support the fluid conduit 102 and the fluid nozzle 124 on the build platform 108, as shown in FIG. 8, during the build. Shifting the fluid conduit 102 and the fluid nozzle 124 to the shifted position (e.g. shown in FIG. 3) can include shifting the supports 118 through the respective apertures 120 until the supports 118 extend externally from the heat shield 104, as shown in FIG. 3. Shifting the supports 118 can include shifting the supports 118 until spacer features, including seals 122 in FIG. 2 and seals 140 in FIG. 9 engage, spacing the heat shield 104 from the fluid conduit 102 to maintain the insulative gap 112 (identified in FIGS. 3), and to help seal stagnant air inside the insulative gap 112. At least some of the apertures 120 through the heat shield 104 can be elongated (as are the apertures 142 in FIG. 10) to accommodate relative thermal expansion/contraction between the fluid conduit 102 and the heat shield 104.

Securing the fluid conduit 102 and the fluid nozzle 124 to the heat shield 104 as indicated in FIG. 3 can include welding, bolting and/or brazing the supports 118 to the heat shield 104. The supports 118 can extend outside the heat shield 104 as shown in FIG. 3, or can be trimmed, e.g. to be flush with the outside of the heat shield 104. Securing the fluid conduit 102 can also include welding, bolting, and/or brazing a flange 146 defined at an upstream end of the fluid conduit 102 to a flange 144 defined at an upstream end of the heat shield 104, e.g., wherein the upstream ends are opposite the downstream ends where the nozzle 124 is located.

The methods and systems of the present disclosure, as described above and shown in the drawings, provide for additive manufacture of fluid conduits and fluid nozzles with heat shielding. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
forming a heat shield surrounding a fluid conduit and a fluid nozzle in an additive manufacturing process, the fluid nozzle being at a downstream end of the fluid conduit;
removing powder from interior passages of the fluid conduit and the fluid nozzle and from gaps defined between the heat shield and the fluid conduit and between the heat shield and the fluid nozzle;
separating the heat shield from the fluid conduit;
separating the heat shield from the fluid nozzle;
separating the heat shield from a build platform;
separating the fluid conduit from the build platform;
separating the fluid nozzle from the build platform;
shifting the fluid conduit and the fluid nozzle to a shifted position relative to the heat shield; and
securing the fluid conduit and the fluid nozzle to the heat shield in the shifted position.

2. The method as recited in claim 1, further comprising forming the fluid nozzle as an annular terminus at the downstream end of the fluid conduit, wherein the annular terminus defines an annular fluid gallery in fluid communication with a flow channel through the fluid conduit.

3. The method as recited in claim 2, further comprising forming an inner heat shield portion of the heat shield radially inside the annular terminus, wherein the inner heat shield portion and the annular terminus define an inner shield gap therebetween, and shifting the fluid conduit and fluid nozzle includes reducing axial extent of the inner heat shield gap.

4. The method as recited in claim 3, further comprising forming an inner air swirler radially inward of the fluid nozzle.

5. The method as recited in claim 2, wherein the heat shield includes an outer heat shield portion radially outside the annular terminus, wherein the outer heat shield portion and the annular terminus define an outer shield gap therebetween, wherein shifting the fluid conduit and fluid nozzle includes reducing axial extent of the outer heat shield gap.

6. The method as recited in claim 5, wherein the outer heat shield portion defines an outer air passage radially outward of the fluid nozzle.

7. The method as recited in claim 1, wherein during forming the fluid conduit inside the heat shield, at least a portion of each of the fluid conduit and heat shield are aligned along a direction that exceeds the maximum build angle of the additive manufacturing process.

8. The method as recited in claim 1, further comprising forming a plurality of supports between the fluid conduit and the build platform, the fluid nozzle and the build platform, and the heat shield and the build platform.

9. The method as recited in claim 8, further comprising supporting the fluid conduit, the fluid nozzle and the heat shield relative to the build platform during the additive manufacturing process with the plurality of supports.

10. The method as recited in claim 8, further comprising forming a series of apertures through the heat shield, wherein each support in the series of supports extends through a respective one of the apertures in the series of apertures.

11. The method as recited in claim 10, wherein the supports extending through the apertures support the fluid conduit and the fluid nozzle on the build platform during the build.

12. The method as recited in claim 11, wherein shifting the fluid conduit and the fluid nozzle to the shifted position includes shifting the supports through the respective apertures until the supports extend externally from the heat shield.

13. The method as recited in claim 12, wherein shifting the supports includes shifting the supports until spacer features engage, spacing the heat shield from the fluid conduit.

14. The method as recited in claim 13, wherein securing the fluid conduit and the fluid nozzle to the heat shield includes welding, bolting and/or brazing the supports to the heat shield.

15. The method as recited in claim 13, wherein securing the fluid conduit includes welding, bolting, and/or brazing a flange defined at an upstream end of the fluid conduit to a flange defined at an upstream end of the heat shield, wherein the upstream end of the fluid conduit is opposite the downstream end of the fluid conduit.

* * * * *